United States Patent [19]

Reynolds

[11] Patent Number: 5,139,380

[45] Date of Patent: Aug. 18, 1992

[54] SCALLOPED NUT AND METHOD OF CONSTRUCTION

[75] Inventor: Richard L. Reynolds, Grosse Pointe Shores, Mich.

[73] Assignee: Pac Fasteners, an affiliate of Peterson American Corporation, Southfield, Mich.

[21] Appl. No.: 619,127

[22] Filed: Nov. 28, 1990

[51] Int. Cl.⁵ .............................................. F16B 37/16
[52] U.S. Cl. .................................... 411/437; 411/937.1
[58] Field of Search ............... 411/437, 436, 276, 266, 411/277, 281, 283, 427, 333, 334, 335, 937.1, 429, 430

[56] References Cited

U.S. PATENT DOCUMENTS

| 81,480 | 8/1868 | Darrow | 411/437 |
|---|---|---|---|
| 569,215 | 10/1896 | Lewis . | |
| 711,653 | 10/1902 | Burdick . | |
| 904,555 | 11/1908 | Neider . | |
| 949,897 | 2/1910 | Higgin . | |
| 1,121,369 | 12/1914 | Johnston | 411/427 |
| 1,157,615 | 10/1915 | Carlson | 411/437 |
| 1,172,427 | 2/1916 | Carlson . | |
| 1,582,530 | 4/1926 | Noll | 411/429 |
| 1,755,590 | 4/1930 | Carr . | |
| 2,026,859 | 1/1936 | Baynes | 411/427 |
| 2,090,640 | 8/1937 | Rosenberg . | |
| 2,252,932 | 8/1941 | Johnson . | |
| 2,279,388 | 4/1942 | Cox | 411/276 X |
| 2,329,158 | 9/1943 | Gill . | |
| 2,364,668 | 12/1944 | Simmons . | |
| 2,378,957 | 6/1945 | Tinnerman . | |
| 2,383,133 | 8/1945 | Kost . | |
| 2,389,278 | 11/1945 | Simmons . | |
| 2,401,202 | 5/1946 | Tinnerman . | |
| 2,435,079 | 1/1948 | Hotchkin . | |
| 2,460,721 | 2/1949 | Thompson . | |
| 2,720,905 | 10/1955 | Bessom | 411/937.1 X |
| 3,006,003 | 10/1961 | Johnson, Jr. | 411/429 X |
| 3,507,182 | 4/1970 | Tinnerman . | |
| 3,507,313 | 4/1970 | Stockslager | 411/937.1 X |
| 3,921,280 | 11/1975 | King . | |
| 4,055,929 | 11/1977 | Stancati et al. . | |
| 4,830,560 | 5/1989 | Hirohata . | |
| 4,934,859 | 6/1990 | Dixon et al. . | |

FOREIGN PATENT DOCUMENTS

| 30888 | 7/1931 | Australia | 411/429 |
|---|---|---|---|
| 238869 | 10/1959 | Australia | 411/437 |
| 1552805 | 2/1970 | Fed. Rep. of Germany | 411/437 |
| 22402 | 12/1961 | German Democratic Rep. | 411/427 |
| 794273 | 4/1958 | United Kingdom | 411/427 |
| 1439811 | 6/1976 | United Kingdom | 411/437 |

Primary Examiner—Rodney M. Lindsey
Attorney, Agent, or Firm—Harness, Dickey & Pierce

[57] ABSTRACT

A sheet metal nut made having a scalloped construction including a tubular barrel portion having a plurality of alternate radially inwardly and radially outwardly and axially extending lobes with a thread formed on the inner lobes which thread form is circumferentially interrupted by virtue of the radial displacement between inner and outer lobes and in one form of the invention the barrel portion having a ring with a continuous thread formed at its outer end to facilitate sealing.

12 Claims, 2 Drawing Sheets

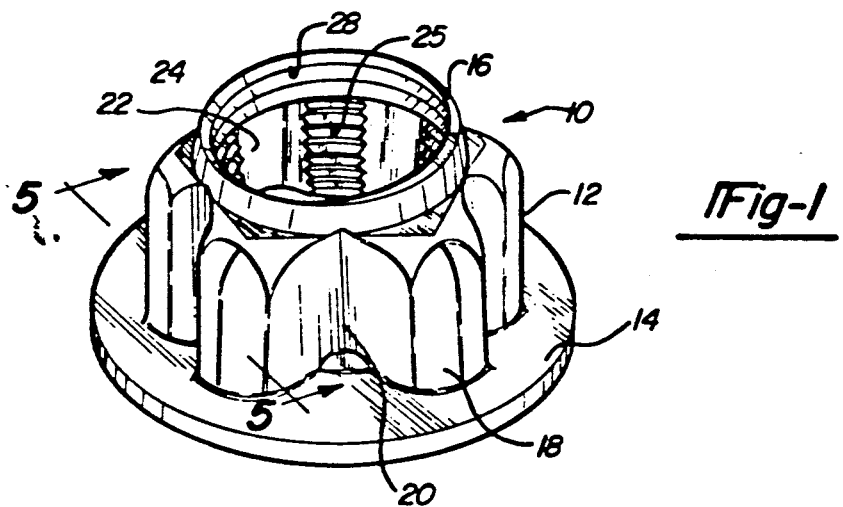
*Fig-1*
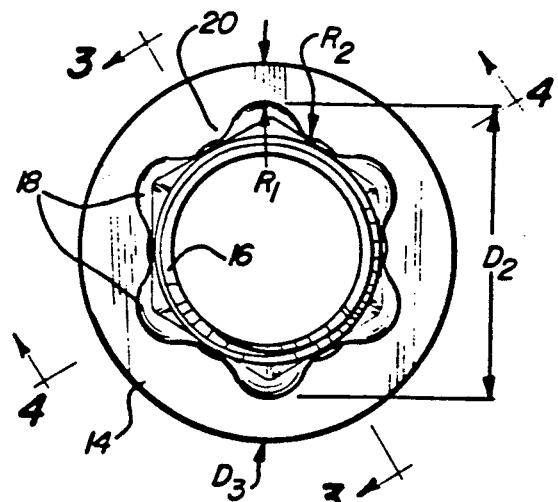
*Fig-2*
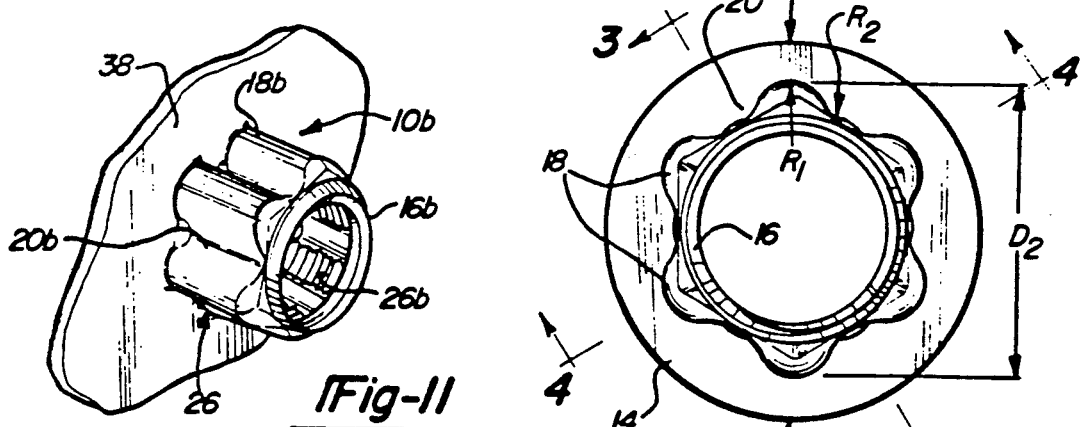
*Fig-11*
*Fig-3*
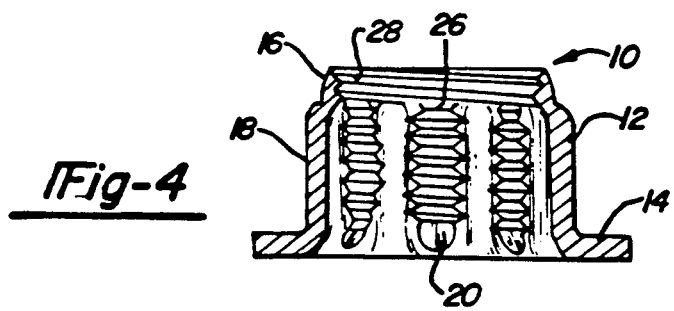
*Fig-4*

SCALLOPED NUT AND METHOD OF CONSTRUCTION

The present invention is related to threaded nut members generally formed by stamping from sheet metal.

SUMMARY BACKGROUND OF THE INVENTION

Threaded nut members made by stamping from generally flat, sheet metal stock are well known and examples of such nut members can be seen from the U.S. Pat. No. 2,378,957 issued Jun. 26, 1945 to G. A. Tinnerman for Fastening Device and U.S. Pat. No. 2,090,640 issued Aug. 24, 1937 to H. Rosenberg for Capped Nut and Art for Producing Same.

In the present invention a lightweight threaded nut member which can be formed from flat sheet metal stock is provided having a high strength to weight ratio. For example with the construction of the present invention a lightweight flanged nut can be formed which has around 80% of the strength of a conventional solid flanged nut of comparable size while having only around one third of its weight.

In the present invention a unique scalloped configuration is utilized which provides the nut member with an outer contour facilitating gripping by a conventional multisided wrench and an inner contour which facilitates the formation of a thread having a high percentage thread engagement with the mating threaded bolt or other threaded member and hence provides a high strength thread. Thus the nut member of the present invention is formed from flat sheet metal into a structure having an essentially uniform cylindrical barrel having an enlarged flange at one end. The nut can also be constructed without a flange. Next the barrel is deformed radially inwardly at a plurality of locations to form radially inwardly, extending lobes having arcuate surfaces spaced from radially outwardly extending lobe having arcuate surfaces. Next an internal or female thread is formed on the inner lobes. While the thread form can be made by metal removal in cutting, it is preferably made by form taps; that is taps that displace metal instead of cutting metal away. As will be seen the result is a lightweight fastener having a high strength to weight ratio and which is of a relatively inexpensive construction.

The unique nut construction also facilitates the provision of a prevailing torque feature. In addition a continuous ring or collar can be added at the top of the barrel of the nut with continuous threads to provide sealing at that end and some increase in thread strength. The nut construction and method of the present invention also facilitates the nut structure being formed integrally with a larger sheet metal part such as a bracket or body member.

Thus it is an object of the present invention to provide a unique, lightweight nut member formed from sheet metal and having a scalloped construction defined by circumferentially alternating radially inner and outer extending lobes.

It is another object of the present invention to provide a unique sheet metal nut and method of construction.

Other objects, features, and advantages of the present invention will become apparent from the subsequent description and the appended claims, taken in conjunction with the accompanying drawings:

DESCRIPTION OF DRAWINGS

FIG. 1 is a pictorial view of one form of sheet metal nut member of the present invention;

FIG. 2 is a top elevational view of the nut member of FIG. 1;

FIG. 3 is a sectional view of the nut member of FIG. 1 taken generally in the direction of the arrows 3—3 of FIG. 2;

FIG. 4 is a sectional view of the nut member of FIG. 1 taken generally in the direction of the arrows 4—4 in FIG. 2;

FIG. 11 is a pictorial view of a nut structure of the type depicted in FIG. 1 and shown formed as part of a sheet metal bracket or body part.

DETAILED DESCRIPTION OF THE EMBODIMENTS OF THE INVENTION

Figure 7:
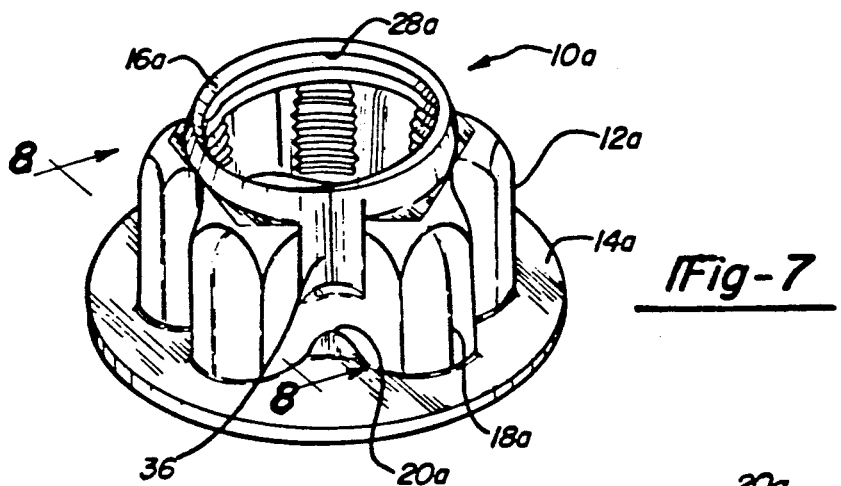
FIG. 7 is a pictorial view similar to that of FIG. 1 depicting the nut member after the prevailing torque feature has been added.

Looking now to FIGS. 1-5, a nut member 10 is shown and includes a barrel portion 12 which terminates at one end in an enlarged, generally flat flange 14. The opposite end of the barrel portion 12 ends in an annular ring portion 16. The nut member 12 is formed from flat sheet metal stock and hence the wall thicknesses of the barrel portion 12, the enlarged flange 14 and the ring portion 16 are substantially the same.

The barrel portion 12 is formed with a plurality of circumferentially, equally, spaced radially outwardly extending lobes 18 alternating with radially inwardly extending lobes 20. In the form of the invention of FIGS. 1-5, six outer lobes 18 alternating with six inner lobes 20 are shown. In this regard, the general outer contour defined by lobes 18 and 20 is an irregular surface which facilitates gripping by a wrenching tool. The outer contour can be made to be gripped by a conventional wrench, i.e. capable of gripping a conventional hex shaped nut, or can be specially formed to permit gripping by a special tool.

The nut member 10 has a through bore 22 with an internal thread 24; the thread 24 includes a lobe thread portion 26 formed across the inner lobes 20 and a ring thread portion 28 which is formed on the ring portion 16 continuously with the lobe thread portion 26.

The outer lobes 18 are formed to have an arcuate shape generally having a radius R1. Similarly the inner lobes 20 are formed to have an arcuate shape generally having a radius R2 before the formation of the lobe thread portion 26 of the internal thread 24.

It is desirable that the resultant inner lobe thread portion 26 define a thread as complete as possible both circumferentially and radially. In the formation of a thread on conventional stamped metal nut structures having a full circumferential thread, the radial formation of the thread by form taps is limited as a result of the very high concentrated pressures that may build up on the tap as the metal of the thread form is displaced. As a result, in order to provide adequate life of the form taps a radially shallow thread is frequently provided. This will result in less available area to engage the mating threads of the associated bolt and provide a resultant weaker threaded connection. In the present invention, the outer lobes 18 define axially extending recesses or voids between the inner lobes 20; thus in forming the lobe thread portion 26, the metal displaced in the tapping operation by the form tap can readily flow circumferentially reducing the loads on the form tap. The result is an increase in the circumferential extent of the lobe thread portion 26 while permitting the resultant thread to have a substantially full radial depth.

In this regard, the radius R2 of the inner lobes 20 is substantially greater than the radius R1 of the outer lobes 18. This results in the circumferential length of the outer lobes 18 being substantially less than that of the inner lobes 20 thereby providing for a higher percentage of material available circumferentially for the formation of the lobe thread portion 26. In one form of the invention, the inner lobe radius R2 was approximately 1.75 times the outer lobe radius R1.

In addition, the radial extent of the inner lobes 20 into the through bore 24 was selected such as to provide an excess in the volume of metal for thread formation resulting in a substantially complete fill of the thread form of the form tap. Thus looking now to FIG. 5, the inner lobes 20, before thread formation, were selected to have a diameter D1 which was less than the root diameter D1' of the associated form tap. The diameter D1' is also the crest diameter of the inner thread portion 26. In one form of the invention, the radius R2 and diameter D1 was selected to define a local volume which was around 120% of the volume defined by the confronting crests and roots of the form tap. As a result, the circumferential length of the lobe thread portion 26 was formed to be at 100% of the final, full thread volume defined by the form tap; in addition, however, because of the adjacent circumferential voids and metal flow into those voids, the thread portion 26 as formed extends circumferentially into the adjacent voids defined by the outer lobes 18 thereby increasing the circumferential length of the thread. In one form of the invention, this results in the lobe thread portion 26 having a circumferential arcuate, length which was around 65% to 70% of the full circumference of the through bore 22 at the same radius.

In one form of the invention the nut member 10 was formed of a medium carbon sheet steel, 1050 steel, having a thickness of around 0.10 inches. The nut member 10 had an outer lobe radius R1 of 0.180 inches and an inner lobe radius R2 of around 0.305 inches. The diameter D1 was around 1.0 inches; diameter D2 was around 1.5 inches and diameter D3 was around 1.75 inches. The nut member 10 was formed with the thread 24 prior to heat treat. Prior to formation of the inner lobe thread portion 26 the inner lobes 20 defined a localized volume of around 120% of the confronting volume of the full thread forming portion of the form tap. The result was that the lobe thread portion 26 had a contour which was substantially a complete reversal of the thread form contour of the form tap and hence substantially completely filled the volume defined by the roots and crests of the form tap, i.e. around 100% fill. At the same time, because of the circumferential displacement of the metal of the inner lobes 20, the lobe thread portion 26 had a circumferential length of between around 65% to around 75% of the overall circumference in the area of the thread portion 26. After the formation of the nut member 10, as described, it was heat treated to a Rockwell hardness of between around Rc32 to around Rc40. In one application with the noted form of the nut member 10, the inner lobe thread portion 26 was able to provide approximately 90% of the available volume of the mating thread on the associated bolt or male threaded member. The resultant lobe thread portion 26 of nut member 10 had approximately 80% of the strength of the same number of threads on a solid nut having a Rockwell hardness of between around 26Rc to around 36RC.

In order to assist the nut member 10 in being threaded onto its associated threaded bolt member, the leading end of the nut member 10 is provided with a chamfer 30 extending around the circumference of the inner lobes 20 at lead in side of the nut 10. The chamfer 30 can have an angle A of around 45°.

It may be desirable in some applications to provide sealing at the top or outer end of the nut member 10. This is provided by the ring portion 16 which defines a substantially full, uniform circular shape. The ring portion 16 is formed of an axial length L sufficient to define at least one full thread. In the embodiment shown in FIG. 1 and the specific form as described above, the axial length L of ring portion 16 was around 0.10 inches, i.e. sufficient such that the ring thread portion 28 was between one and around two full threads. Note that while additional strength is provided by the ring thread portion 28 it is of a relatively small percentage of the overall strength because of the limited extent of the thread. In addition, note that in the forming process, the inner and outer diameters of the ring portion 16 are chamfered and converge such that the available volume of material for formation of the ring thread portion 28 is less than that for the lobe thread portion 26. Note that in forming the complete thread 24 in bore 22, the form tap is started from the lead in side (i.e. end having flange portion 14); thus the effect of the limited axial extent of ring thread portion 28 on the form tap is minimal.

As noted, one advantage to the present invention is the ease and accuracy by which a prevailing torque characteristic can be provided to the nut member 10. This is shown in the embodiment of FIGS. 6-10 in which components similar to like components in the embodiment of FIGS. 1-5 have been given the same numerical designation with the addition of the letter postscript 'a'. Except where modified below, the description of the same numbered components shall be considered to be the same and, for purposes of simplicity, shall not be repeated.

Figure 6:
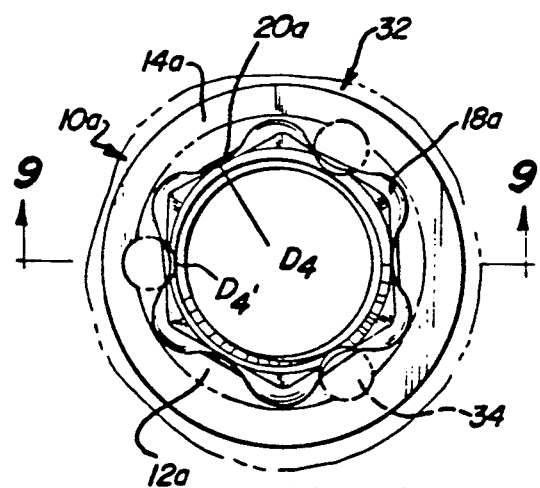
FIG. 6 is a top elevational view depicting the formation of a prevailing torque characteristic on a nut structure such as that shown in FIG. 1 with the fixture for providing the prevailing torque characteristic shown in phantom.
Figure 8:
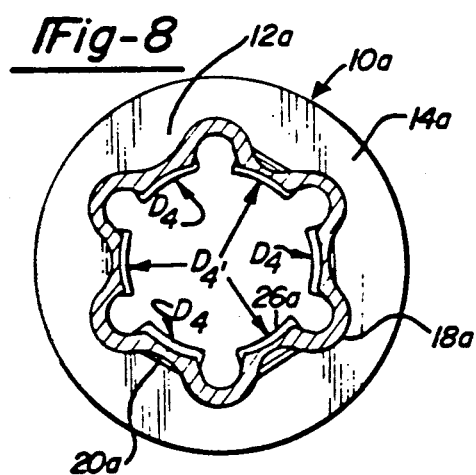
FIG. 8 is a sectional view of the nut member of FIG. 7 taken generally in the direction of the arrows 8—8 in FIG. 7.
Figure 9:
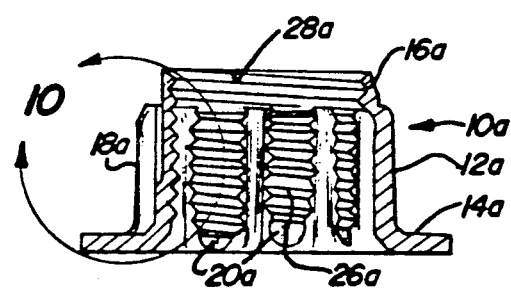
FIG. 9 is a sectional view of only the nut member only of FIG. 6 taken in the direction of the arrows 9—9 in FIG. 6 after the prevailing torque feature has been added.
Figure 10:
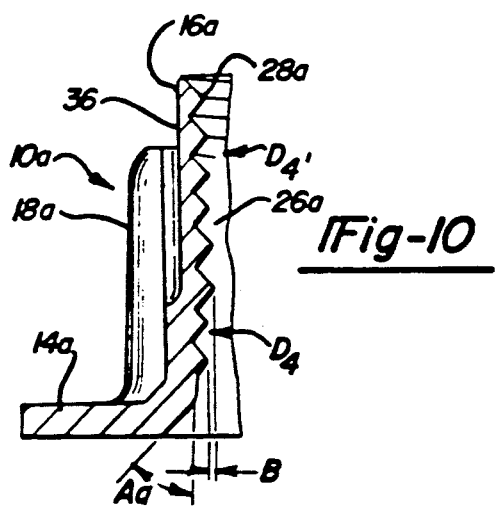
FIG. 10 is a fragmentary sectional view to enlarged scale of the parts of the nut member of FIG. 9 generally noted in the circle 10.
Figure 5:
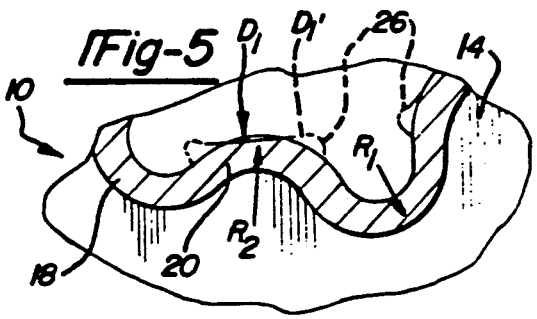
FIG. 5 is a fragmentary sectional view to enlarged scale of the nut member of FIG. 1 taken generally in the direction of the arrows 5—5 in FIG. 1 showing in solid lines the barrel portion before the lobe thread portion is formed therein and depicting in phantom the thread portion as formed by metal displacement.

Thus looking now to FIG. 6, the nut member 10a is shown in a fixture 32 (shown in phantom) having a plurality of ball members 34. In the form shown in FIG. 6, three ball members 34 are utilized and are equally circumferentially spaced to engage three of the inner lobes 20a. The ball members 34 are located to define a diameter D4' which is a preselected amount less than diameter D4 prior to application of the fixture 32. Thus as the barrel portion 12a is moved axially relative to the ball members 34, the three inner lobes 20a which are engaged are deformed radially inwardly to reduce the diameter D4 to a preselected smaller diameter D4' (see radially deformed surface 36 in FIGS. 7 and 10). This axial extent of the radial inward deformation can be controlled to provide the desired degree of prevailing torque characteristic. Because of the spacing between the inner lobes 20a provided by the outer lobes 18a only those inner lobes 20a engaged by the ball members 34 will be deformed radially inwardly. Thus the general overall circular contour of the barrel portion 12a will be maintained except for the local deformation noted. In this manner, the formation of an elliptical shape as with other types of nut structures is avoided. Again, the total prevailing torque characteristic can be carefully controlled not only by the amount of radial deformation of the selected inner lobes 20a but also by the axial extent of the deformation. In the specific form of the invention noted the local radial reduction was between around 0.015 inches to around 0.020 inches, i.e. less than around 1% of the diameter D4, and was provided over one half of the axial length of the lobe thread portion 26a involved. Note that because of the tapered or chamfered configuration of the ring portion 16a, that portion is not in substantial engagement with the ball members 34 and hence is generally unaffected. Note also that the deformation of the lobe thread portion 26a is axially limited leaving at least between around 1 and around 2 threads at the leading end, i.e. flange 14a, to facilitate initial threading onto the threads of the associated bolt. The noted deformation step would be done before heat treating of the nut member 10a to its desired hardness in order to facilitate that operation. Note that while the prevailing torque characteristic is shown as being applied to three inner lobes 20a it could be readily applied to two, four or all six inner lobes 20a.

As noted the nut structure of the present invention can be formed integrally with a larger sheet metal component such as a bracket or sheet metal part. Such construction is illustrated in FIG. 11, where components similar to like components in the embodiment of FIGS. 1-5 are given the same numeral designation with the addition of the postscript letter "b". Unless described otherwise, similarly numbered components are substantially the same and hence, for purposes of simplicity, the description thereof will not be repeated.

Thus in FIG. 11, a nut member 10b is shown formed integrally with a larger sheet metal component 38 such as a bracket or portion of a larger sheet metal part. Thus this construction could facilitate the assembly of sheet metal components with a high strength nut structure which is integral with one of the sheet metal components to be secured.

While it will be apparent that the preferred embodiments of the invention disclosed are well calculated to fulfill the objects stated above, it will be appreciated that the invention is susceptible to modification, variation and change without departing from the proper scope or fair meaning of the invention.

What is claimed is:

1. A sheet metal nut comprising:
   a tubular barrel portion,
   a plurality of radially outwardly extending outer lobes extending axially along said barrel portion and defining a outside diameter of said barrel portion,
   a plurality of radially inwardly extending inner lobes extending axially along said barrel portion circumferentially between said outer lobes, and defining an inside diameter of said barrel portion,
   said outer lobes defining circumferentially spaced voids between said inner lobes at said inside diameter,
   an internal lobe thread formed on the radially inner surface of said inner lobes at said inside diameter,
   said internal lobe thread extending partially circumferentially into the voids defined by the adjacent ones of said outer lobes,
   said inner lobes having a circumferential length substantially greater than that of said outer lobes,
   said internal lobe thread having a circumferential arcuate thread length of around 65% to around 70% of the circumference of said inside diameter,
   said internal lobe thread having a substantially full and generally constant radial depth over substantially all of said circumferential arcuate thread length.

2. The nut of claim 1 with each said outer lobe having a generally arcuate contour having a first radius and with each said inner lobe having a generally arcuate contour having a second radius which is substantially greater than said first radius.

3. The nut of claim 1 with each said outer lobe having a generally arcuate contour having a first radius and with each said inner lobe having a generally arcuate contour having a second radius which is substantially greater than said first radius, said second radius being around 1.75 times said first radius.

4. The nut of claim 1 having a continuous ring portion at one end of said barrel portion and with said ring portion having a continuous internal thread as a continuation of said internal lobe thread.

5. The nut of claim 1 with at least some of said inner lobes being radially inwardly offset after thread formation to provide a prevailing torque characteristic.

6. A sheet metal nut comprising:
   a tubular barrel portion,
   a plurality of radially outwardly extending outer lobes extending axially along said barrel portion and defining a outside diameter of said barrel portion,
   a plurality of radially inwardly extending inner lobes extending axially along said barrel portion circumferentially between said outer lobes, and defining an inside diameter of said barrel portion,
   said outer lobes defining circumferentially spaced voids between said inner lobes at said inside diameter,
   an internal lobe thread formed on the radially inner surface of said inner lobes at said inside diameter,
   said internal lobe thread extending partially circumferentially into the voids defined by the adjacent ones of said outer lobes,
   said internal lobe thread having a circumferential arcuate thread length of around 65% to around 70% of the circumference of said inside diameter,
   said internal lobe thread having a substantially full and generally constant radial depth over substantially all of said circumferential arcuate thread length.

7. A sheet metal nut having an internal thread formed by a form tap for application onto the mating thread of an associated male threaded member, said sheet metal nut comprising:
- a tubular barrel portion,
- a plurality of radially outwardly extending outer lobes extending axially along said barrel portion and defining a outside diameter of said barrel portion,
- a plurality of radially inwardly extending inner lobes extending axially along said barrel portion circumferentially between said outer lobes, and defining an inside diameter of said barrel portion,
- said outer lobes defining circumferentially spaced voids between said inner lobes at said inside diameter,
- an internal lobe thread formed on the radially inner surface of said inner lobes at said inside diameter,
- an internal lobe thread extending partially circumferentially into the voids defined by the adjacent ones of said outer lobes,
- said internal lobe thread having a circumferential arcuate thread length of around 65% to around 70% of the circumference of said inside diameter,
- said internal lobe thread formed to be at substantially 100% of the thread volume defined by the form tap and hence having a substantially full and generally constant radial dept over substantially all of said circumferential arcuate thread length.

8. The sheet metal nut of claim 7 with said internal lobe thread having around 90% of the available volume of the mating thread on the associated male threaded member.

9. A fastening system including:
(a) a sheet metal nut member comprising:
- a tubular barrel portion,
- a plurality of radially outwardly extending outer lobes extending axially along said barrel portion and defining a outside diameter of said barrel portion,
- a plurality of radially inwardly extending inner lobes extending axially along said barrel portion circumferentially between said outer lobes, and defining an inside diameter of said barrel portion,
- said outer lobes defining circumferentially spaced voids between said inner lobes at said inside diameter,
- an internal lobe thread formed on the radially inner surface of said inner lobes at said inside diameter,
- said internal lobe thread extending partially circumferentially into the voids defined by the adjacent ones of said outer lobes,
- said internal lobe thread having a circumferential arcuate thread length of around 65% to around 70% of the circumference of said inside diameter, and (b) a male threaded member having a mating thread for threadable engagement with said internal lobe thread,
- said internal lobe thread having a substantially full radial depth over substantially all of said circumferential arcuate thread length with said full radial depth being substantially 90% of the available volume of said mating thread on said male threaded member.

10. The fastening system of claim 9 with said inner lobes of said nut member having a circumferential length substantially greater than that of said outer lobes, and each of said outer lobes of said nut member having a generally arcuate contour having a first radius and with each of said inner lobes having a generally arcuate contour having a second radius which is substantially greater than said first radius.

11. The fastening system of claim 9 with each of said outer lobes of said nut member having a generally arcuate contour having a first radius and with each of said inner lobes of said nut member having a generally arcuate contour having a second radius which is substantially greater than said first radius, said second radius being around 1.75 times said first radius.

12. The fastening system of claim 9 with said nut member having a continuous ring portion at one end of said barrel portion and with said ring portion having a continuous internal thread as a continuation of said internal lobe thread.

* * * * *

UNITED STATES PATENT AND TRADEMARK OFFICE
CERTIFICATE OF CORRECTION

PATENT NO. : 5,139,380

DATED : August 18, 1992

INVENTOR(S) : Richard L. Reynolds

It is certified that error appears in the above-identified patent and that said Letters Patent is hereby corrected as shown below:

Col. 7, line 20, Claim 7, delete "an" and substitute therefor --said--.

Signed and Sealed this

Ninth Day of November, 1993

Attest:

BRUCE LEHMAN

*Attesting Officer*           *Commissioner of Patents and Trademarks*